United States Patent

[11] 3,610,359

| [72] | Inventor | Bernard B. Becker<br>Belmont, Mass. |
|---|---|---|
| [21] | Appl. No. | 877,264 |
| [22] | Filed | Nov. 17, 1969 |
| [45] | Patented | Oct. 5, 1971 |
| [73] | Assignee | Hyster Company<br>Portland, Oreg. |

[54] TRUCK WITH MOVABLE CONTROL PANEL
8 Claims, 5 Drawing Figs.

| [52] | U.S. Cl. | 180/68.5 |
|---|---|---|
| [51] | Int. Cl. | B62d 25/00 |
| [50] | Field of Search | 180/65, 68.5, 89; 187/9 |

[56] References Cited
UNITED STATES PATENTS

| 2,854,088 | 9/1958 | Dence | 180/89 |
|---|---|---|---|
| 3,235,035 | 2/1966 | Weaver | 187/9 |

FOREIGN PATENTS

| 1,439,918 | 4/1966 | France | 180/89 |

*Primary Examiner*—Evon C. Blunk
*Assistant Examiner*—I. Kenneth Silverman
*Attorney*—Chittick, Pfund, Birch, Samuels & Gauthier

ABSTRACT: In a battery powered material handling truck in which the batteries are located beneath a panel on which are mounted the controls, a pivoted construction is provided permitting both the panel and controls to swing up and forward away from their normal position above the batteries thereby providing a clear space above the batteries so that an overhead hoist may be used to remove them.

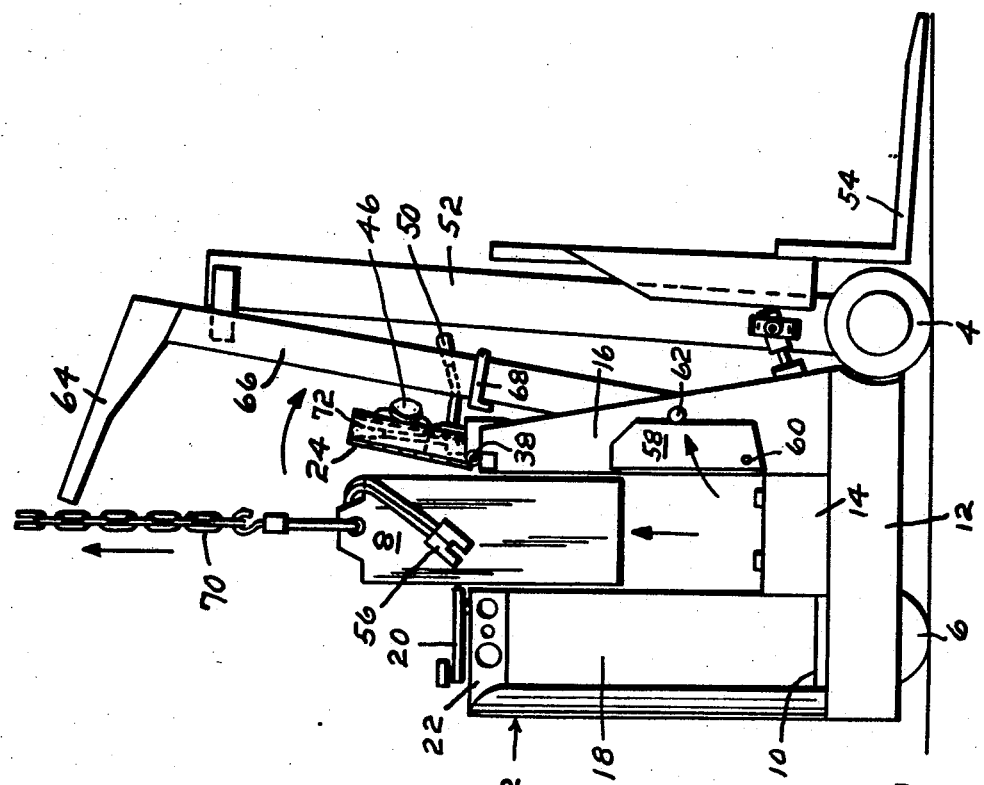
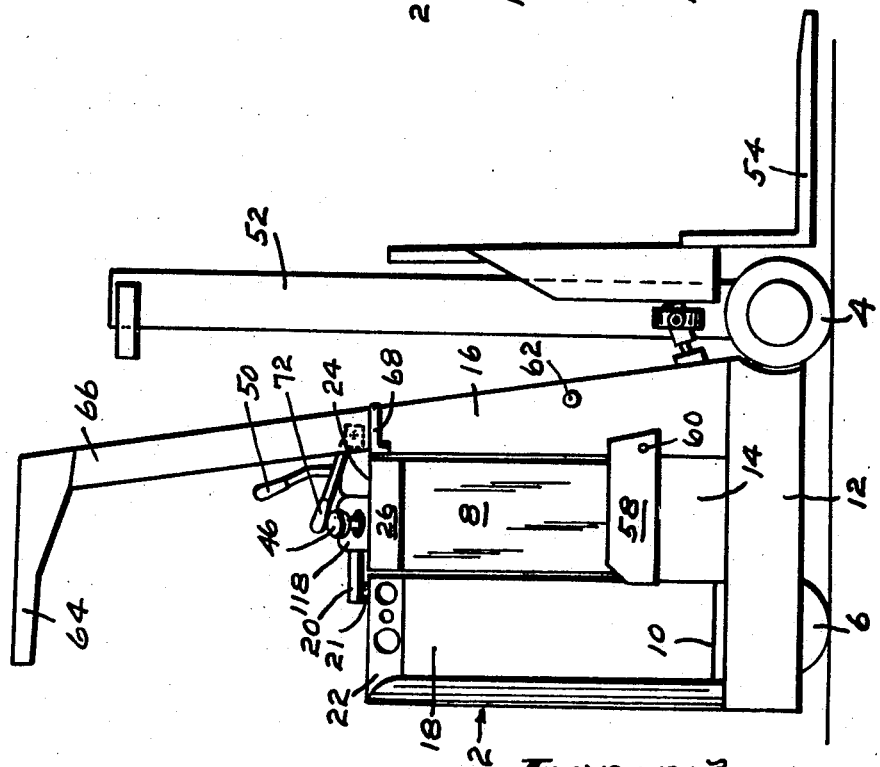

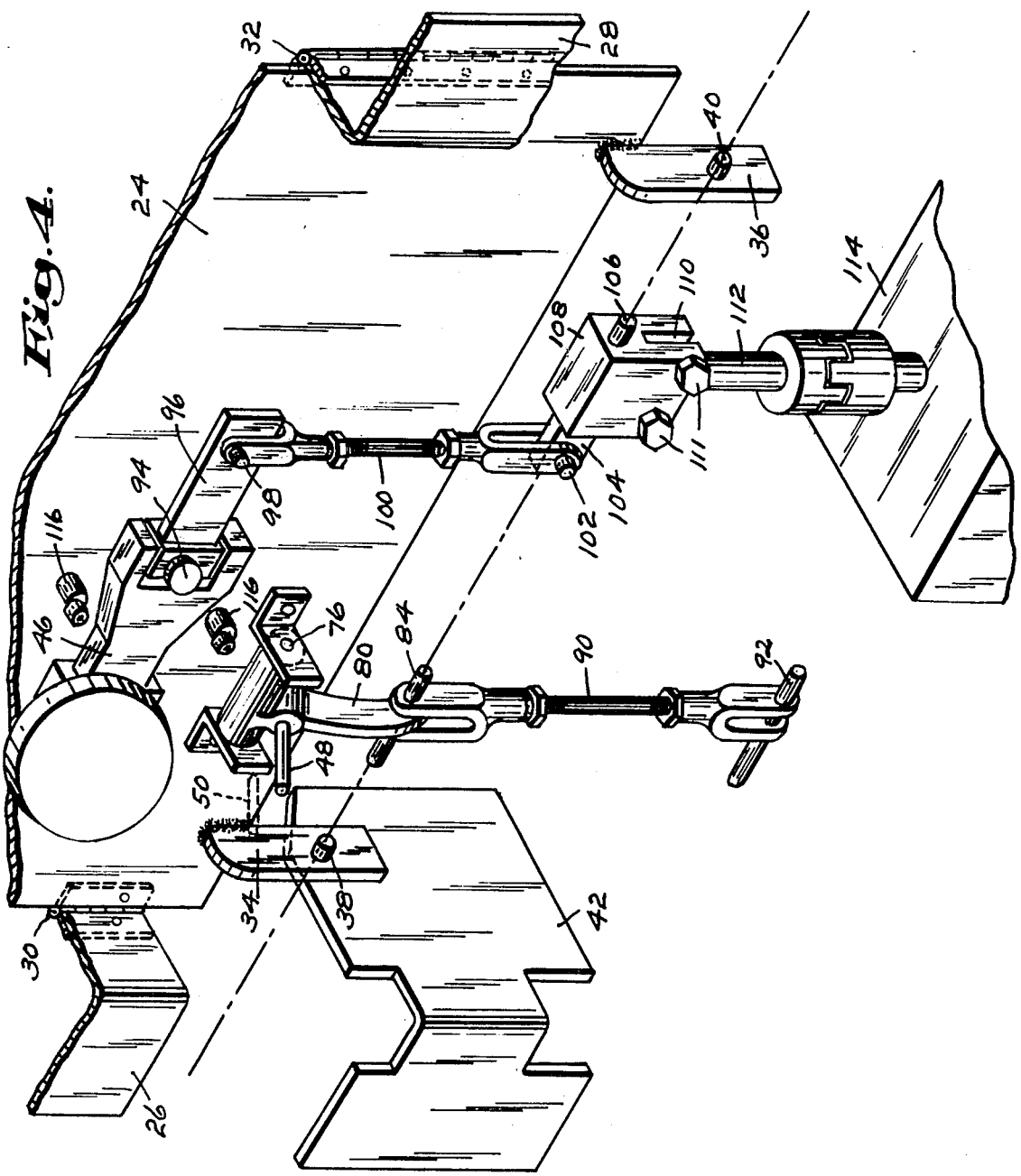

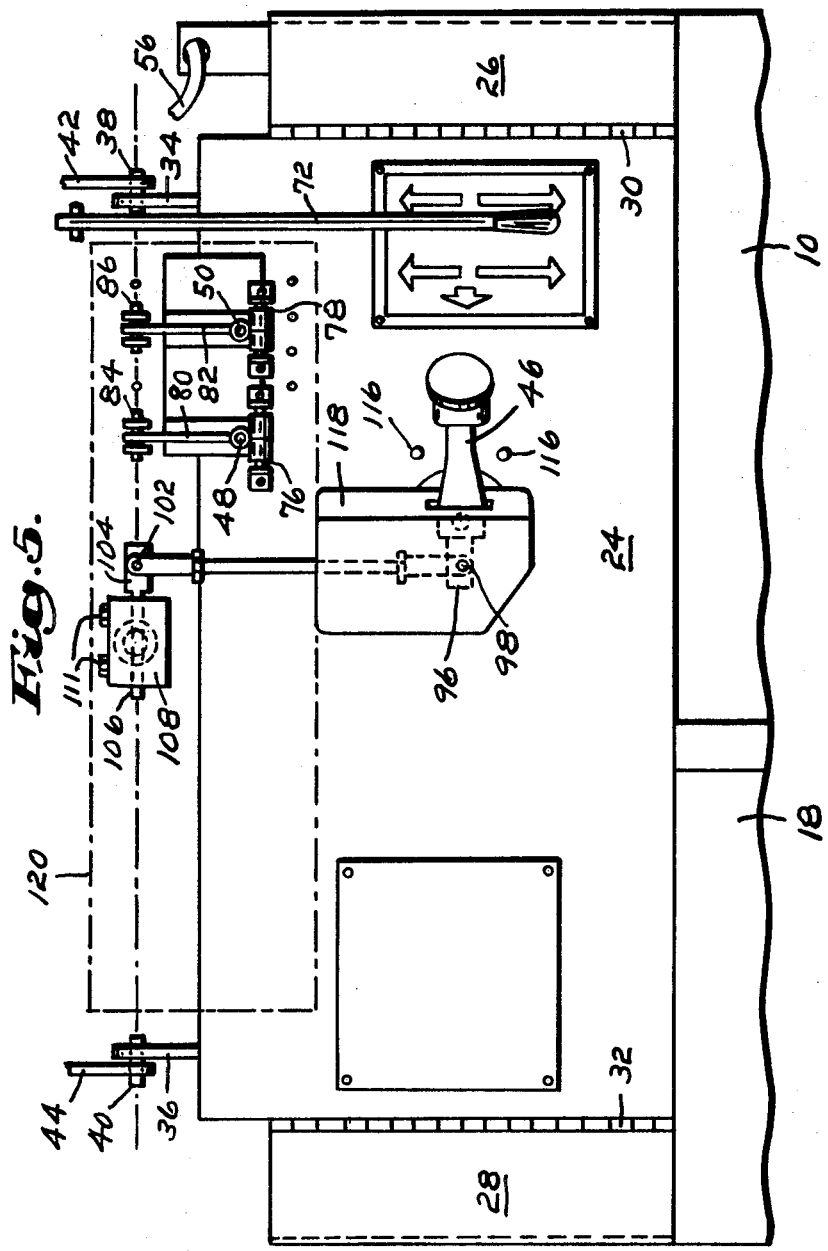

TRUCK WITH MOVABLE CONTROL PANEL

BRIEF SUMMARY OF THE INVENTION

In the material handling truck field, the trucks are driven by gasoline engines or battery operated electric motors. This invention relates to the battery driven trucks of the type in which the batteries are so large and heavy that it is necessary to use a chain hoist or equivalent to install or remove them. In most trucks, the batteries are located to the rear of the operator's position and covered only by a light easily removed cover.

There are some trucks, however, which are so short in overall length that, to provide stability, the heavy batteries must be placed more or less midway of the front to rear length. When in this position, it has been found necessary to place the controls directly over the batteries. Thus, when the batteries are to be removed for recharging, there is the complication of removing the control panel to clear the space over the batteries so that a chain hoist may be used.

The present invention is, therefore, directed to a control panel constructed in such manner that without disconnection of any of the controls and related linkages, the panel and the controls attached thereto may be swung upwardly and forwardly out of the way of the batteries. After the battery change has been made, the control panel and the controls mounted thereon may be swung back from vertical to horizontal position over the batteries and the truck is then ready to resume operation.

To accomplish the aforesaid result, each system of levers and linkages connecting each control handle to its truck operating mechanism has therein a pivoted connection which is aligned with the pivots on which the panel is hinged. Thus when the panel is swung about its own pivots, the control linkages affixed to the panel and to the operating mechanism may likewise swing about their own individual pivots.

BRIEF DESCRIPTION OF THE DRAWINGS

FIG. 1 is a side elevation of a battery powered truck incorporating the present invention.

FIG. 2 shows the truck of FIG. 1 with an overhead guard swung forwardly and the pivoted control panel upwardly to provide overhead clearance for the use of a chain hoist for use for removing the battery.

FIG. 4 is a perspective view similar to FIG. 3 but with the panel and the controls swung to vertical position to open the space above the battery.

FIG. 5 is a plan view of the control panel and the controls mounted thereon in normal operative horizontal position.

PREFERRED EMBODIMENT OF THE INVENTION

Figure 3:
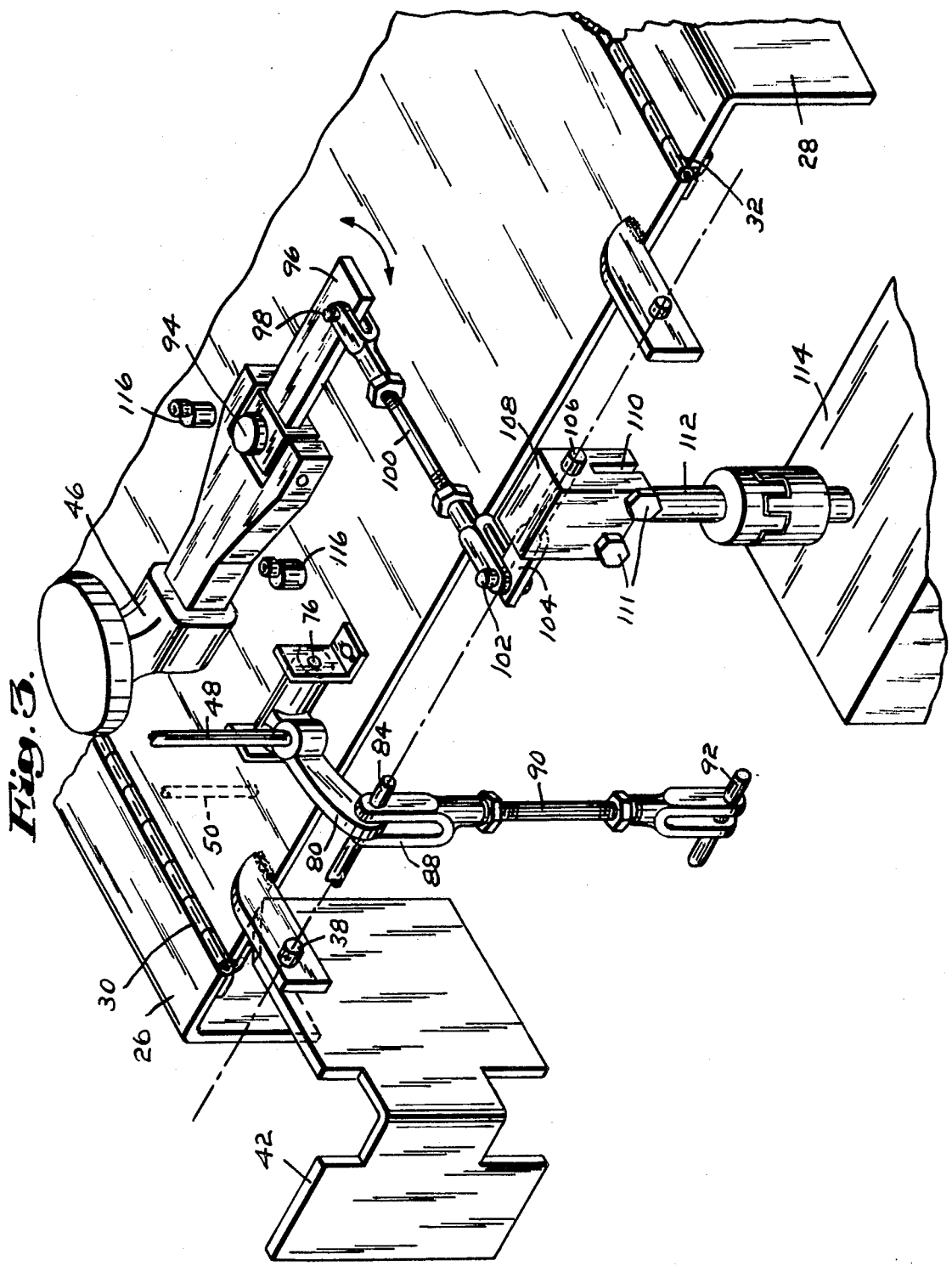
FIG. 3 is a perspective view looking from front to rear of the control panel and controls in normal operating position. For clarity, the front part of the truck housing has been omitted.

Referring first to FIGS. 1 and 2, there is shown a material handling truck generally referred to at 2. The truck has a pair of spaced front wheels 4, and a steering and driving wheel unit 6 at the rear. In this type truck, the length of the wheelbase is usually between 3 and 4 feet, so it becomes essential that the battery 8 be located well within the wheelbase. The operator stands on a platform 10 behind the right-hand side of the battery 8 which extends the full width of the truck. The lower frame 12 includes a battery carrying platform 14 and there is an upwardly extending from frame 16 within which are various operating mechanisms to be referred to hereinafter. A housing 18 to the left of the operator's platform 10 supports a steering handle 20 mounted on shaft 21, and an instrument panel 22.

Overlying the batteries as shown in FIG. 1 is a control panel 24 which extends more or less the full width of the truck. This panel is seen in plan view in FIG. 5. At each end of the panel 24 are end flaps 26, 28 hinged to the panel at 30 and 32, respectively. At the forward end of the panel are hinges 34 and 36 pivoted at 38 and 40 to parts of the frame structure 16 indicated at 42 and 44. The segment-type steering handle 20 mounted on shaft 21 can be swung to the rear clear of panel 24 as shown in FIG. 2.

Mounted on panel is a speed control lever 46 and the levers 48 and 50 (see FIG. 5) for actuating the hydraulic elements which cause conventional tilting of the mast 52 and raising and lowering of the fork 54. A separable battery connection is shown at 56 in FIGS. 2 and 5.

The lower right side of the battery compartment has a small side gate 58 pivoted at 60. This gate may be swung from the position of FIG. 1 to that of FIG. 2 where it engages a stop 62 to limit its forward movement and is clear of the side of the battery.

An overhead guard 64 often required by state law and serving to protect the operator against falling objects, is mounted on a pair of spaced supports 66 pivoted at their lower end to the front frame 16. Latches 68, pivotally mounted on the supports 66, hold the guard 64 in the position shown in FIG. 1 during normal operation of the truck. When the latches 68 are raised, the supports 66 and guard 64 may be pushed forwardly as shown in FIG. 2 to rest against the mast 52. In this position, the rear of the guard 64 has moved forward of the midposition of the battery. Also in FIG. 2, the panel 24 has been shown as swung to vertical position about the pivots 38 and 40. See also FIG. 4. Thus with panel 24 out of the way and the overhead guard in sufficiently forward position to permit the utilization of a chain hoist 70 shown in FIG. 2, the battery 8 can be raised and removed from the truck in the manner illustrated.

The details of the construction permitting the panel 24 and control levers 46, 48 and 50 to be swung to vertical position will now be explained by reference to FIGS. 3, 4 and 5. First, however, if the truck has a handbrake such as lever 72 shown in generally horizontal position and overlying panel 24 as in FIGS. 1 and 5, the brake lever will be swung to vertical position as in FIG. 2 thereby applying the brake and removing it from interference with upward movement of panel. The handbrake pivot 74 is affixed to the truck frame 16 at a position forward of the panel hinges 38 and 40. The end flaps 26 and 28 shown in FIGS. 3 and 5 are first swung upwardly through 90° to free them from any engagement with the upper part of the battery.

The speed control lever 46 is mounted for horizontal swinging movement on a pivot 94. Lever 46 has an extension 96 pivotally connected at 98 with link 100 which in turn is pivotally connected at 102 with a lever arm 104 having a cylindrical extension 106 rotatably mounted within block 108. Block 108, split at its lower end as at 110, is clamped by bolts 111 on the upper end of a shaft 112 which leads downward to motor control box 114. Forward or backward movement of control lever 46, limited by stops 116, results in rotation of shaft 112 to cause forward or backward movement of the truck.

The hydraulic control levers 48 and 50 as shown in FIG. 5 are mounted on individual horizontal pivots 76 and 78. For clarity, only the control lever 48 and related linkages are shown in FIGS. 3 and 5 although lever 50 is suggested in dotted lines. Only the linkages related to lever 48 will be referred to since the linkages to lever 50 are the same. Arm 80 extends forwardly from lever 48. Its outer end is pivoted as at 84 within the ears 88 of a link 90 (see FIGS. 3 and 4) the lower end of which is connected as at 92 with a valve actuating member (now shown) for controlling the hydraulic system which moves the fork 54 up and down. The lever 50 and related linkages control movement of the mast 52 forward or backward. With the control lever 48 in normal position with the panel 24 horizontal, it is apparent that forward or backward movement of lever 48 will cause appropriate up and down movement of link 90 thereby to control the related hydraulic system.

It will now be observed in FIGS. 3 and 5 that the pivots 84 and 86 at the front ends of the levers 80 and 82 of the hydraulic controls, and the centerline of cylindrical extension 106 in block 108 are in alignment with the panel pivots 38 and 40.

Thus when panel 24 is swung from horizontal position as in FIGS. 3 and 5, to vertical position as in FIG. 4, the control levers and linkages on the panel can move therewith without in any way disturbing the position of the element 90 leading to the hydraulic controls or the shaft 112 leading to the motor control box 114.

It will also be appreciated that when the panel 24 is in vertical position as in FIG. 4, the lever 48 and the motor control lever 46 cannot be moved to affect the hydraulic system or the motor controls. That is to say, when the panel 24 is moved to a vertical position as in FIG. 4 the controls must be in neutral position and cannot thereafter be moved because any attempt to move lever 46 will be prevented by arm 104 which cannot accept vertical movement and likewise movement of lever 48 will be precluded because link 90 cannot respond to horizontal movement of pivot 84.

With the panel in vertical position as shown in FIGS. 2 and 4, and with the protective overhead guard 64 swung forwardly as in FIG. 2, and with the brake handle 72 incapable of accidental release because of the forward panel position the battery may be removed and replaced through the use of chain hoist 70 or an equivalent mechanism. As soon as the new battery is in place, the panel 24 may be swung downwardly to horizontal position as in FIGS. 1, 3 and 5 the end flaps 26 and 28 returned to battery securing position, the electrical plug 56 may be repositioned in its socket, and the brake handle 72 swung to horizontal position. The truck will then be ready for further operation.

While it constitutes no part of the invention, it should be noted that the extension 96 and the adjacent part of link 100 actuated by control lever 46 are protected by a housing 118 shown in FIGS. 1, 2 and 5 but omitted in FIGS. 3 and 4. The housing is principally a safety feature to minimize the possibility of any thing jamming the linkage to prevent movement of the control lever 46. Additionally, there is preferably another cover suggested by the dot-dash line 120 in FIG. 5 which overlies the several linkages. This cover is secured to panel 24 and moves with the panel when the latter is raised.

Modifications and further applications of the invention will now be apparent to those skilled in the art without departing from the spirit of the invention.

I claim:

1. In a battery driven material handling truck including a frame, an operator's platform carried by said frame, a battery located in front of said platform, a control panel normally positioned over said battery, said panel hinged to said frame for upward forward swinging movement to a position vertically clear of said battery, control levers pivotally mounted on said panel, truck operating mechanisms carried by said frame, linkages connecting said levers are in OFF position, whereby when said levers are in OFF position, whereby when said levers are in OFF position, said panel and levers mounted thereon may be swung forwardly out of vertical alignment with said battery without disconnection of said linkages, and when said panel has been swung forwardly, said lever actuated linkages that are above their points of pivotal connection along the line of said pivots having their direction of lever induced movement changed through a substantial angle unacceptable by said linkages and mechanisms below said line of pivots whereby said mechanisms cannot be energized.

2. The construction as set forth in claim 1, said frame having mounted thereon an overhead guard normally located over said operator's platform, and means permitting movement of said guard forwardly to a position beyond the transverse center line of said battery.

3. The construction as set forth in claim 2, said guard being mounted on said frame by spaced members pivoted to said frame and means for limiting forward movement of said guard.

4. The construction as set forth in claim 1, said control levers on said panels including at least a motor control lever and a lever for controlling movement of a lifting fork.

5. The construction as set forth in claim 1, at least one of said control levers being mounted on a vertical pivot and at least another of said control levers being mounted on a horizontal pivot.

6. The construction set forth in claim 1, said panel having downwardly extending end flaps which overlap the upper sides of said battery, said end flaps being hingedly connected to said panel whereby they may be swung upwardly clear of the battery before said panel is swung forwardly.

7. The construction set forth in claim 1, the hinges between said panel and frame and the pivots in said linkages that are aligned therewith being located vertically close to the plane of the panel.

8. The construction set forth in claim 1, a brake for said truck and a brake actuating lever pivoted to said frame and operable from OFF to ON position while said panel is in normal position, said panel when in forward position preventing movement of said brake lever to OFF position.

PO-1050
(5/69)

UNITED STATES PATENT OFFICE
CERTIFICATE OF CORRECTION

Patent No. 3,610,359      Dated October 5, 1971

Inventor(s) Bernard B. Becker

It is certified that error appears in the above-identified patent and that said Letters Patent are hereby corrected as shown below:

Col. 1, Line 65: Change "from" to --front--.

Col. 2, Line 16: Change "end" to --ends--.

Col. 2, Line 37: After "panel" insert --24--.

Col. 4, Line 5: After "levers" insert --to said mechanisms, said linkages including pivots which pivots are aligned with said panel hinges when said levers--

Col. 4, Lines 6 and 7: After "," delete "whereby when said levers are in OFF position,"

Signed and sealed this 18th day of April 1972.

(SEAL)
Attest:

EDWARD M. FLETCHER, JR.
Attesting Officer

ROBERT GOTTSCHALK
Commissioner of Patents